(12) United States Patent
Yamaguchi et al.

(10) Patent No.: US 11,239,671 B2
(45) Date of Patent: Feb. 1, 2022

(54) IN-VEHICLE POWER STORAGE DEVICE AND CONTROL METHOD THEREOF

(71) Applicants: Shingo Yamaguchi, Tokyo (JP); Toshiaki Date, Tokyo (JP); Satoshi Wachi, Tokyo (JP)

(72) Inventors: Shingo Yamaguchi, Tokyo (JP); Toshiaki Date, Tokyo (JP); Satoshi Wachi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 121 days.

(21) Appl. No.: 14/397,801

(22) PCT Filed: Oct. 10, 2012

(86) PCT No.: PCT/JP2012/076195
§ 371 (c)(1),
(2) Date: Oct. 29, 2014

(87) PCT Pub. No.: WO2014/057538
PCT Pub. Date: Apr. 17, 2014

(65) Prior Publication Data
US 2015/0108951 A1    Apr. 23, 2015

(51) Int. Cl.
*H02J 7/00* (2006.01)

(52) U.S. Cl.
CPC ............ *H02J 7/0029* (2013.01); *H02J 7/007* (2013.01); *H02J 7/007192* (2020.01); *H02J 7/0048* (2020.01)

(58) Field of Classification Search
CPC ...... H02J 7/0029; H02J 7/0031; H02J 7/0032; H02J 7/0034; H02J 7/0046; H02J 7/007;
(Continued)

(56) References Cited

U.S. PATENT DOCUMENTS

| 6,819,066 B2 | 11/2004 | Ishikawa et al. |
| 2003/0111971 A1 | 6/2003 | Ishikawa et al. |

(Continued)

FOREIGN PATENT DOCUMENTS

| CN | 101512826 A | 8/2009 |
| DE | 10 2012 109 430 A1 | 5/2013 |

(Continued)

OTHER PUBLICATIONS

International Search Report of PCT/JP2012/076195 dated Dec. 11, 2012.
(Continued)

*Primary Examiner* — Richard Isla
*Assistant Examiner* — Michael N Dibenedetto
(74) *Attorney, Agent, or Firm* — Sughrue Mion, PLLC; Richard C. Turner (57) ABSTRACT

An in-vehicle power storage device that discharges a battery in a case where collision of a vehicle is detected or predicted, and stops discharging the battery when an over-discharged state has not been reached, and a control method thereof. The in-vehicle power storage device includes: a battery mounted in a vehicle; charge-state detection means for detecting a charge state of the battery; and a discharging load for discharging the battery, and a control device which includes: battery charge-state detection means for detecting a charge state; a battery discharger means for discharging the battery using the load if collision of the vehicle is detected or predicted; and discharge stopping means to stop discharging the battery before the battery becomes over-discharged.

17 Claims, 8 Drawing Sheets

(58) Field of Classification Search
CPC ............... H02J 7/1446; H02J 2007/004; H02J 2007/0067; B60L 11/1851; B60L 11/1853; B60L 11/1855; B60L 11/1857; B60L 11/1859; B60L 11/1861; B60L 11/1862
USPC ................................. 320/104; 318/139, 194
See application file for complete search history.

(56) References Cited

U.S. PATENT DOCUMENTS

| | | | | |
|---|---|---|---|---|
| 2004/0012374 | A1* | 1/2004 | Kamenoff | H02J 7/0063 320/135 |
| 2005/0057096 | A1* | 3/2005 | Kudo | B60T 8/4872 303/155 |
| 2006/0033469 | A1* | 2/2006 | Beaty | B60L 3/0046 320/104 |
| 2006/0091854 | A1* | 5/2006 | Chen | H02J 7/0016 320/116 |
| 2006/0091857 | A1* | 5/2006 | Nakanishi | B60L 11/1851 320/116 |
| 2009/0108808 | A1* | 4/2009 | He | H02J 7/0031 320/134 |
| 2009/0205897 | A1 | 8/2009 | Endo et al. | |
| 2010/0127662 | A1* | 5/2010 | Ha | H01M 10/441 320/118 |
| 2011/0221374 | A1* | 9/2011 | Maebara | H02M 7/53871 318/494 |
| 2012/0056598 | A1* | 3/2012 | Kim | H02J 7/0031 320/136 |
| 2012/0187914 | A1 | 7/2012 | Ha et al. | |
| 2013/0043840 | A1* | 2/2013 | Bylsma | H02J 7/0016 320/118 |
| 2013/0106362 | A1* | 5/2013 | Mackintosh | H01M 10/425 320/136 |
| 2015/0051771 | A1 | 2/2015 | Greenwood et al. | |

FOREIGN PATENT DOCUMENTS

| | | |
|---|---|---|
| GB | 2500427 A | 9/2013 |
| JP | 2006-143141 A | 6/2006 |
| JP | 3858797 B2 | 12/2006 |
| JP | 3893965 B2 | 3/2007 |
| JP | 2007-312488 A | 11/2007 |
| JP | 2010-503185 A | 1/2010 |
| JP | 2010-225581 A | 10/2010 |
| JP | 2011-217544 A | 10/2011 |
| JP | 2011-228076 A | 11/2011 |

OTHER PUBLICATIONS

Communication dated Jun. 2, 2015 from the Japanese Patent Office in counterpart application No. 2014-540655.
Communication dated Aug. 16, 2016 from the State Intellectual Property Office of the P.R.C. in counterpart Application No. 201280076328.0.
Communication dated Jun. 18, 2020, issued by the German Patent Office in German Application No. 11 2012 007 003.8.

* cited by examiner

IN-VEHICLE POWER STORAGE DEVICE AND CONTROL METHOD THEREOF

CROSS REFERENCE TO RELATED APPLICATIONS

This is a National Stage of International Application No. PCT/JP2012/076195 filed Oct. 10, 2012, the contents of which are incorporated herein by reference in its entirety.

TECHNICAL FIELD

The present invention relates to power storage devices to be mounted in vehicles, in particular, in-vehicle power storage devices that prevent, for example, malfunction of batteries in the case of collision of the vehicles being detected or predicted, and a control method thereof.

BACKGROUND ART

In vehicles, for example, batteries are provided which temporarily store electric energy generated by generators that are connected to internal combustion engines by belts or the like, and supply necessary power to electric devices even in a state where the internal combustion engines do not rotate and power cannot be generated by the generators.

Further, in recent years, a vehicle that has a plurality of batteries mounted therein for efficiently converting energy of the vehicle that is decelerating, to electric energy and storing the electric energy, has emerged, and, in some cases, the vehicle has a battery for efficiently storing electric energy of the vehicle and a battery used for, for example, starting the vehicle.

The batteries or wiring from the batteries to the electric devices are generally insulated so as not allow a passenger or auto mechanics to directly touch the batteries or wiring. However, in the case of collision of the vehicle, the insulated portion may be damaged to cause electric shock or the like.

For example, according to Patent Document 1, power of a plurality of battery cells is forcibly consumed by a common load in the case of collision of the vehicle, to address electric shock.

Further, for example, according to Patent Document 2, supply of power to a battery is stopped in the case of collision of the vehicle, and an engine starting device to which power is supplied from the battery is provided, and the battery is discharged to a minimum voltage required for starting the engine to address electric shock while enabling the engine to be started.

CITATION LIST

Patent Document

Patent Document 1: Japanese Patent No 3893965
Patent Document 2: Japanese Patent No. 3858797

SUMMARY OF THE INVENTION

Problems to be Solved by the Invention

However, in the conventional art disclosed in Patent Document 1, discharge stopping means is not provided, so that the battery is discharged until a charge state represents almost 0 (zero).

Further, in the conventional art disclosed in Patent Document 2, the battery that is not used for starting the engine is discharged until a charge state represents almost 0.

Therefore, in the conventional arts disclosed in Patent Document 1 and Patent Document 2, overdischarge of batteries is not considered.

When a battery is overdischarged, deterioration of the battery is promoted. Further, when an overdischarged battery is charged, short-circuiting may occur in the battery and the battery may ignite or smoke. Therefore, even if the battery is not damaged due to shock at the collision of the vehicle, the battery cannot be reused.

The present invention is made to solve the aforementioned problems, and an object of the present invention is to provide an in-vehicle power storage device that discharges a battery in a case where collision of the vehicle is detected or predicted, and stops discharging the battery when an overdischarge has not been reached yet, and a control method thereof.

Solution to the Problems

The present invention is directed to an in-vehicle power storage device including: a battery mounted in a vehicle; battery charge-state detection means for detecting a charge state of the battery; and a discharging load for discharging the battery, and, in the in-vehicle power storage device, a control device is provided which includes: battery discharging means for discharging the battery by using the load in a case where collision of the vehicle is detected or predicted; and battery discharge stopping means for causing the battery discharging means to stop discharging the battery when a charge state of the battery detected by the battery charge-state detection means is less than or equal to a predetermined value at which overdischarge has not been reached yet.

Effect of the Invention

In the in-vehicle power storage device and the control method thereof according to the present invention, a battery is discharged in a case where collision of a vehicle is detected or predicted, and the discharging is stopped before the charge state of the battery becomes an overdischarged state, thereby preventing overdischarging of the battery and enabling the battery to be reused.

DESCRIPTION OF EMBODIMENTS

Embodiment 1

Figure 1:
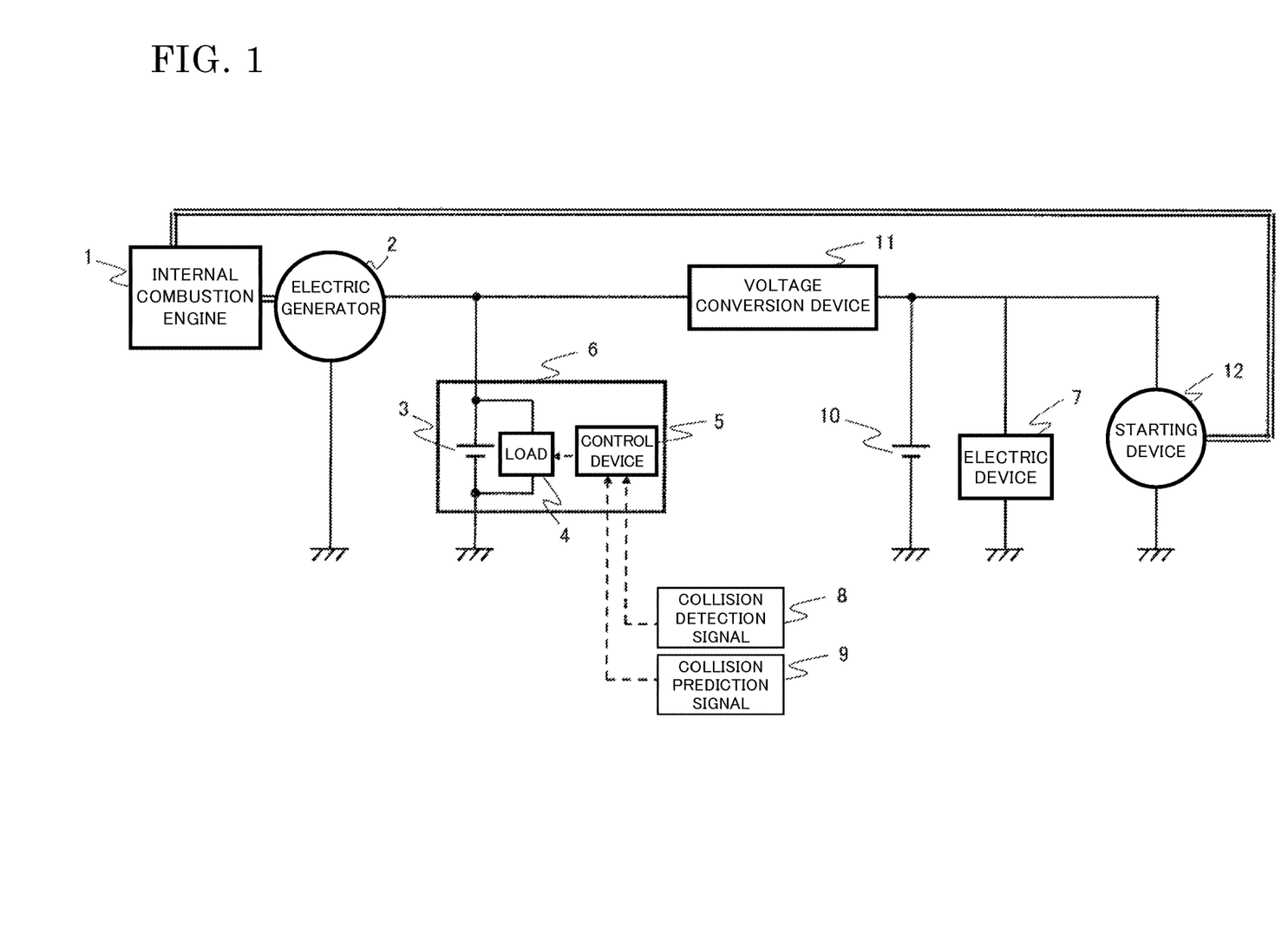
FIG. 1 is a schematic configuration diagram illustrating an example of a power supply system of an internal combustion engine including an in-vehicle power storage device according to embodiment 1 of the present invention.

FIG. 1 is a schematic configuration diagram illustrating an example of a power supply system of an internal combustion engine including an in-vehicle power storage device according to embodiment 1 of the present invention.

An internal combustion engine 1 and an electric generator 2 are connected to each other by a belt or the like, and when the internal combustion engine 1 rotates, the electric generator 2 also rotates.

When the electric generator 2 rotates, a battery 3 is charged with electric energy generated by the electric generator 2, the electric energy is subjected to voltage conversion by a voltage conversion device 11 to be consumed by an electric device 7, or a sub-battery 10 is charged with the electric energy. Power for driving a starting device 12 for starting the internal combustion engine 1 is supplied from the sub-battery 10.

A discharging load 4 is connected in parallel with the battery 3. A control device 5 provides an instruction to perform discharging with the load 4 or stop discharging in a case where collision of the vehicle is detected or predicted, as described below.

Further, the battery 3, the load 4, and the control device 5 are mounted in a case 6.

Further, a collision detection signal 8 is generated by, for example, an air bag control device (not shown), and inputted to the control device 5.

Further, a collision prediction signal 9 is generated by, for example, a front detection radar or a camera control device (not shown), and inputted to the control device 5.

Further, the battery 3 is, for example, a lithium ion battery. The lithium ion battery is a secondary battery in which a positive electrode and a negative electrode are insulated by a separator, and lithium ions move, in an electrolyte solution, between the positive electrode and the negative electrode to perform charging and discharging.

When the lithium ion battery is overdischarged, an electrolyte solution may be decomposed, or copper used for the negative electrode may be ionized and dissolved in the electrolyte solution in the battery.

The copper ions may be recrystallized by charging being performed, and thus internal short-circuiting may be caused in the positive electrode and the negative electrode.

The sub-battery 10 may be a lithium ion battery, or may be another type of battery.

In consideration of a case where a voltage is different between the battery 3 and the sub-battery 10, the voltage conversion device 11 is provided. However, when a voltage is almost equal therebetween, a switch or the like may be used instead thereof.

Figure 2:
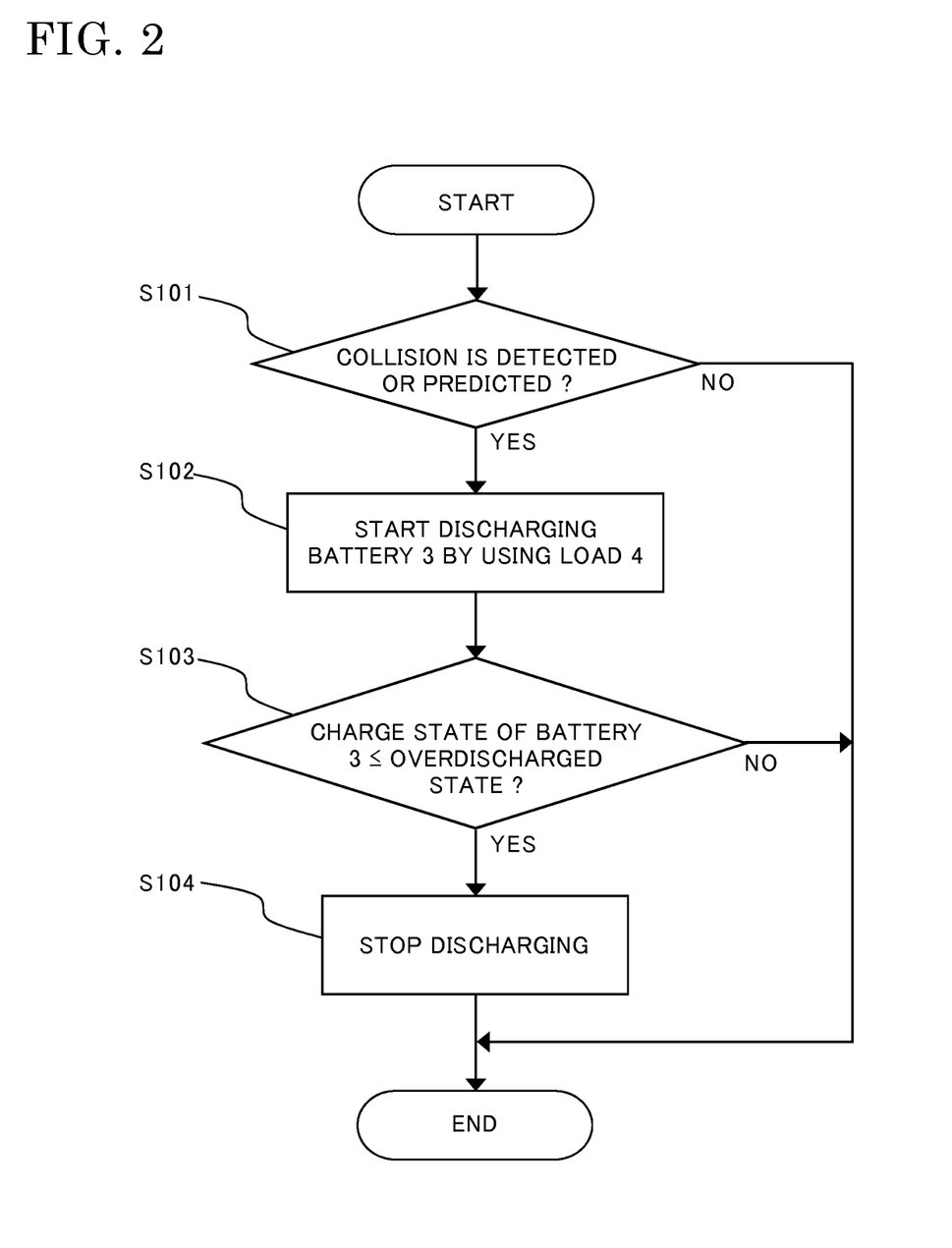
FIG. 2 is a flow chart showing a process performed by a control device in the in-vehicle power storage device according to embodiment 1 of the present invention.

FIG. 2 is a flow chart showing a process performed by the control device 5 in the in-vehicle power storage device according to embodiment 1 of the present invention. The process is periodically performed by the control device 5 (for example, every 10 ms).

With reference to the flow chart of FIG. 2, the in-vehicle power storage device according to embodiment 1 of the present invention will be described.

In step S101, collision of the vehicle is detected or predicted according to the collision detection signal 8 or the collision prediction signal 9. When collision of the vehicle is not detected or predicted, the process is ended.

When collision of the vehicle is detected or predicted in step S101, the process is advanced to step S102, and discharging of the battery 3 is started by means of the load 4. The steps S101 to S102 correspond to battery discharging means.

After the start of the discharging, in step S103, a charge state of the battery 3 is checked, and whether or not the charge state is less than or equal to a predetermined value to be an overdischarged state, is determined.

The charge state is calculated based on, for example, a voltage of the battery 3 or a charged/discharged amount of current. When the charge state is not determined to be less than or equal to the predetermined value to be an overdischarged state, the process is ended.

When the charge state of the battery 3 is determined to be less than or equal to the predetermined value to be an overdischarged state, the process is advanced to step S104, to stop discharging the battery 3 and end the process.

Steps S103 to S104 correspond to battery discharge stopping means.

In FIG. 2, after the discharging is started in step S102, whether or not the charge state is less than or equal to the predetermined value to be an overdischarged state, is determined in step S103. However, whether or not the charge state of the battery 3 is less than or equal to the predetermined value to be an overdischarged state, may be previously determined, and only when the charge state is not determined to be less than or equal to the predetermined value, the discharging may be started.

Further, in the above exemplary case, only discharging of the battery 3 is controlled by the control device 5 in a case where collision of the vehicle is detected or predicted. However, according to the charge state of the battery 3, charging or discharging of the battery 3 may be controlled by the control device 5.

As described above, according to embodiment 1, the in-vehicle power storage device that includes: the battery 3 mounted in a vehicle; the battery charge-state detection means for detecting a charge state of the battery 3; and the discharging load 4 for discharging the battery 3, includes the control device 5, and the control device 5 includes: the battery charge-state detection means for detecting a charge state of the battery 3; the battery discharging means for discharging the battery 3 by using the load 4 in a case where collision of a vehicle is detected or predicted; and the battery discharge stopping means for causing the battery discharging means to stop discharging the battery 3 when the charge state of the battery 3 detected by the battery charge-state detection means is less than or equal to the predetermined value at which overdischarge has not been reached yet. Thus, a battery is discharged in a case where collision of a vehicle is detected or predicted, and the discharging is stopped before the charge state of the battery becomes an overdischarged state, thereby preventing overdischarging of the battery and enabling the battery to be reused.

Further, when a lithium ion battery excellent in receiving electric energy generated by an electric generator, is used, overdischarging of the lithium ion battery can be prevented. Therefore, electrolyte solution can be prevented from being decomposed or copper used for a negative electrode can be prevented from being ionized and dissolved in the electrolyte solution.

Further, the discharging load is accommodated in a case, and is not touched by a person, thereby preventing electric shock.

Embodiment 2

Figure 3:
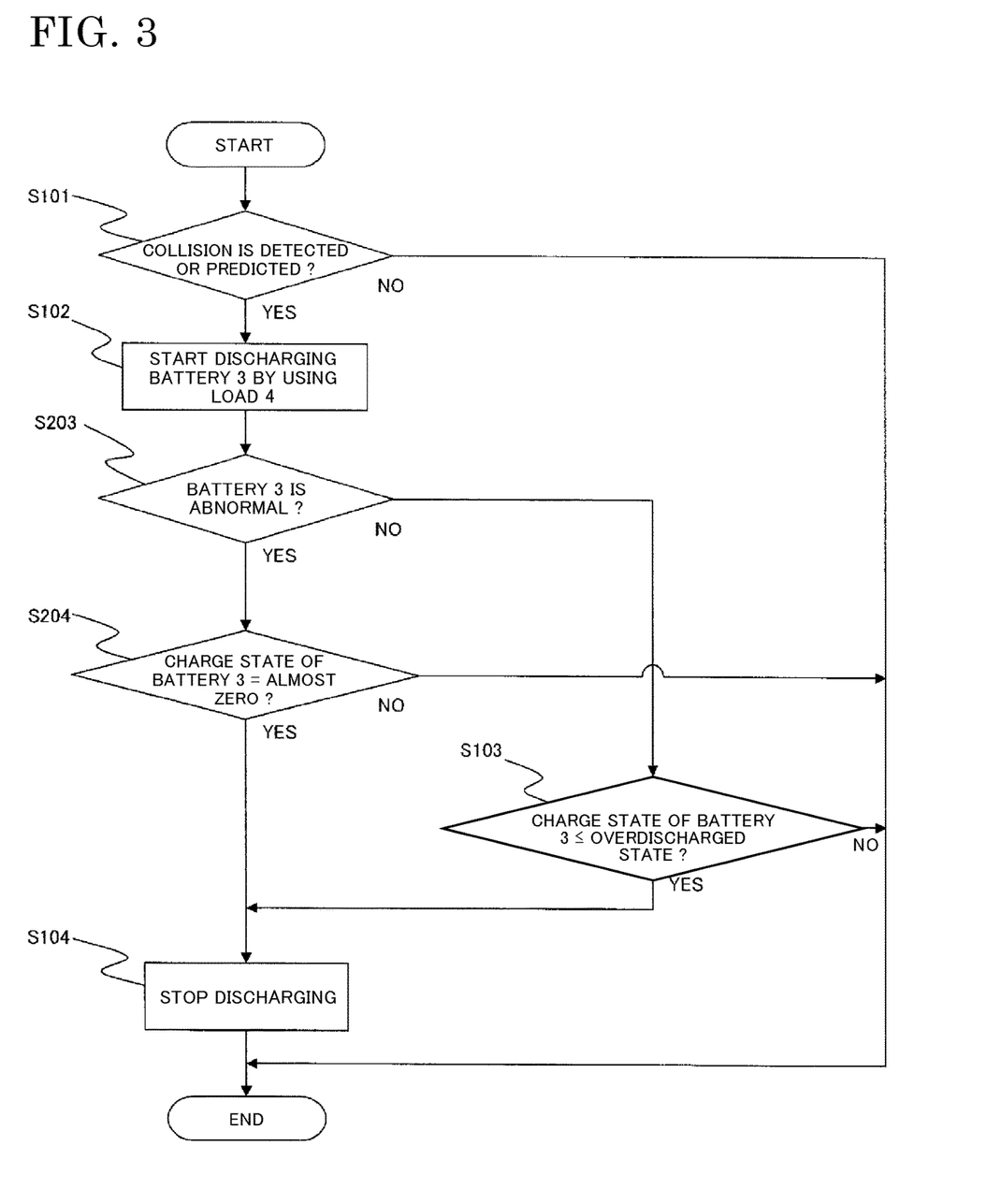
FIG. 3 is a flow chart showing a process performed by a control device in an in-vehicle power storage device according to embodiment 2 of the present invention.

FIG. 3 is a flow chart showing a process performed by the control device 5 in an in-vehicle power storage device according to embodiment 2 of the present invention. The process is periodically performed by the control device 5 (for example, every 10 ms). Embodiment 2 is different from embodiment 1 in that step S203 and step S204 are additionally performed in embodiment 2 as shown in FIG. 3.

Hereinafter, a difference of FIG. 3 from FIG. 2 will be described.

In FIG. 3, after discharging of the battery 3 is started in step S102, whether or not the battery 3 is abnormal is determined in step S203. Step S203 corresponds to battery abnormality detection means.

Whether or not the battery 3 is abnormal is determined according to, for example, change in temperature or voltage of the battery 3.

When the battery 3 is determined as being abnormal in step S203, the process is advanced to step S204, and whether or not the charge state of the battery 3 represents almost 0 (zero), is determined. When the charge state of the battery 3 represents almost zero, the process is advanced to step S104 to stop the discharging.

In FIG. 3, when the charge state of the battery 3 represents almost zero, the discharging is stopped. However, the discharging may not be stopped.

When the charge state of the battery 3 does not represent almost zero in step S204, the process is ended.

When the battery 3 is not determined as being abnormal in step S203, the process is advanced to step S103.

In the configuration as in embodiment 2, a battery is discharged in an abnormal state until the charge state represents almost zero. Therefore, energy of the battery can be reduced, to prevent ignition or smoking in the case of short-circuiting occurring inside the battery.

Further, since detection for abnormality of the battery is performed after the start of the discharging, even in a case where it takes time to detect abnormality due to a voltage or temperature of a battery being gradually changing when, for example, slight short-circuiting occurs inside the battery, discharging is started and the discharging can be performed to reach a voltage at which electric shock can be prevented before a result of determination as to malfunction is obtained.

Embodiment 3

Figure 4:
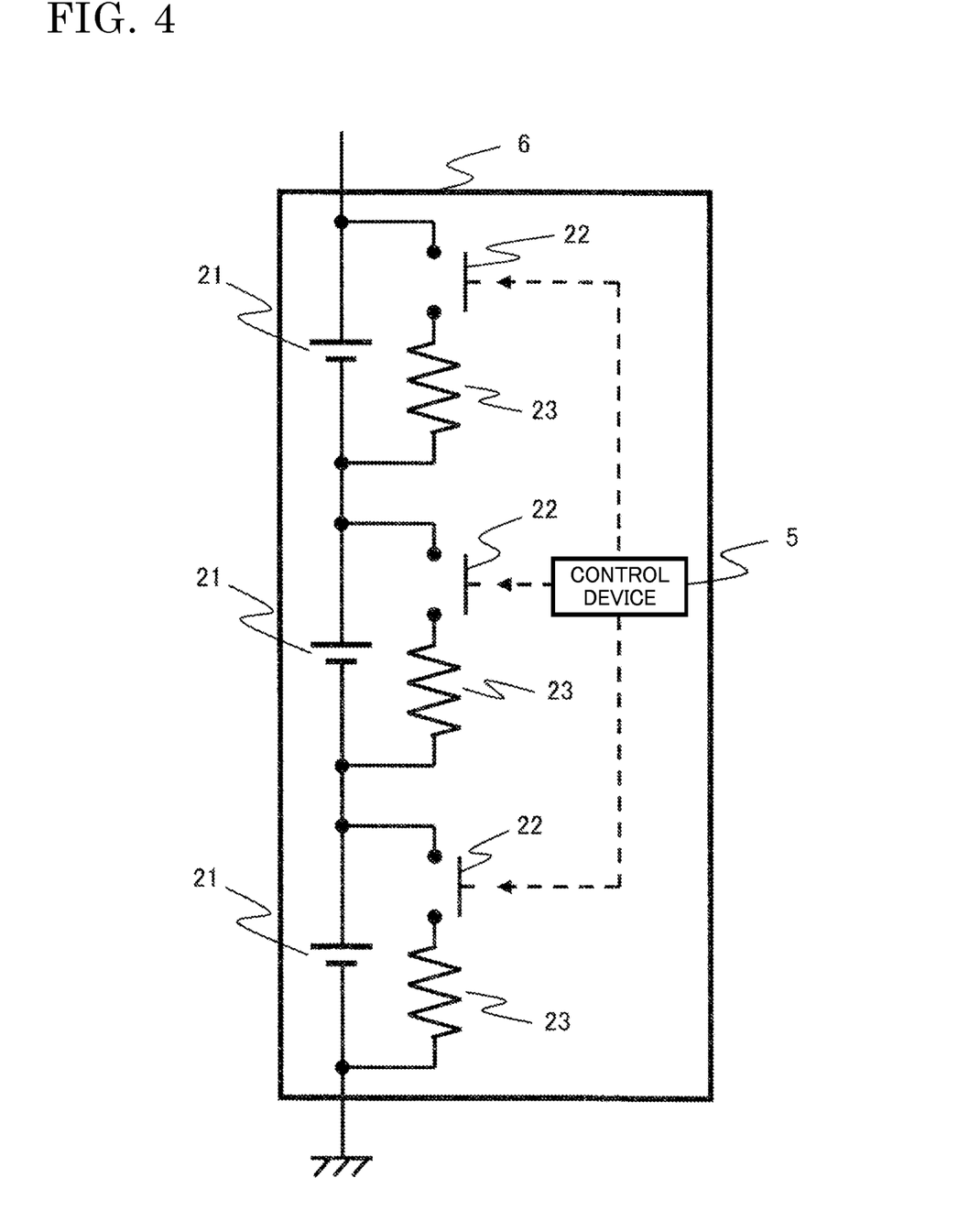
FIG. 4 is a connection diagram illustrating an exemplary case where battery cells are used as an in-vehicle power storage device according to embodiment 3 of the present invention.

FIG. 4 is a connection diagram illustrating a case where a plurality of battery cells 21 are connected, as the battery 3, in series with each other in an in-vehicle power storage device according to embodiment 3 of the present invention, and illustrates only the inside of the battery case 6 shown in FIG. 1.

The battery 3 is implemented as an assembled battery in which the plurality of battery cells 21 are connected in series with or in parallel with each other. In FIG. 4, three battery cells 21 are connected in series with each other. However, the battery cells 21 may be connected in parallel with each other, or series connection and parallel connection may be mixed.

Further, a bypass circuit including a resistor 23 and circuit opening/closing means 22 may be connected, as the discharging load 4, in parallel with each battery cell 21. The circuit opening/closing means 22 is opened or closed by the control device 5.

Figure 5:
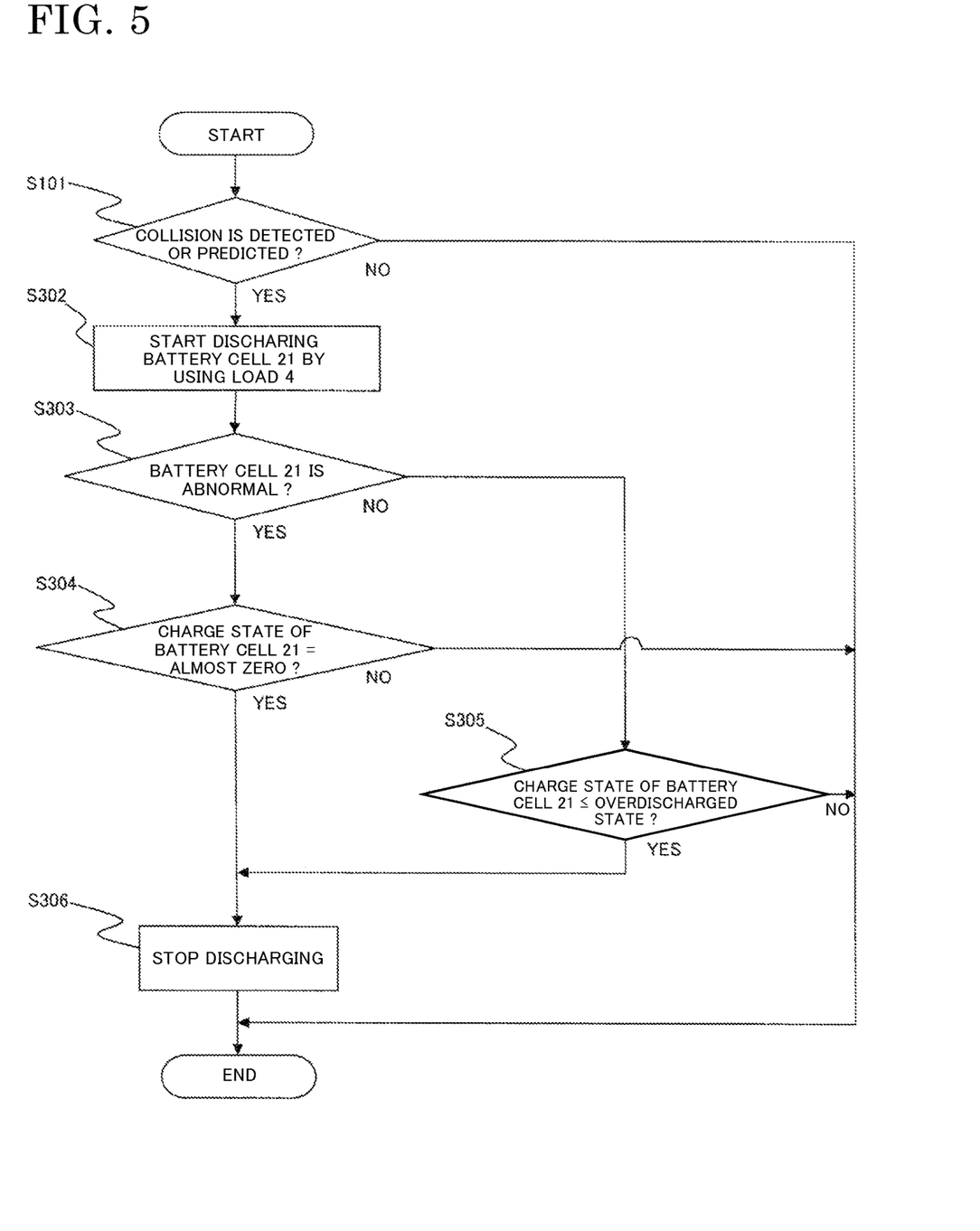
FIG. 5 is a flow chart showing a process performed by a control device in the in-vehicle power storage device according to embodiment 3 of the present invention.

FIG. 5 is a flow chart showing a process performed by the control device 5 in the in-vehicle power storage device that includes the plurality of battery cells 21 and the bypass circuit connected in parallel with each battery cell 21 as shown in FIG. 4. The process is periodically performed by the control device 5 (for example, every 10 ms).

In this process, a processing target is changed from the battery 3 to the battery cells 21 as compared to FIG. 3, and the process is performed for each battery cell 21.

In FIG. 5, step S102 in FIG. 3 is changed to step S302, step S203 in FIG. 3 is changed to step S303, step S204 in FIG. 3 is changed to step S304, step S103 in FIG. 3 is changed to step S305, and step S104 in FIG. 3 is changed to step S306.

The process shown in FIG. 5 and the process shown in FIG. 3 are different only in that, in FIG. 5, the process steps in FIG. 3 are performed for the battery cells 21 instead of the battery 3. Therefore, the description is omitted.

In the configuration as in embodiment 3, a bypass circuit that is already prepared for making voltages of the battery cells uniform can be used, and a new bypass circuit for discharging a battery in the case of collision of the vehicle need not be prepared.

Further, the battery cell determined as being abnormal is discharged until the charge state represents almost zero. Therefore, energy of the battery can be reduced, to prevent ignition or smoking in the case of short-circuiting occurring inside the battery. Discharging of the battery cell that is not determined as being abnormal, is stopped before the charge state of the battery cell reaches an overdischarged state, thereby preventing overdischarging of the battery and enabling the battery to be reused.

Embodiment 4

Figure 6:
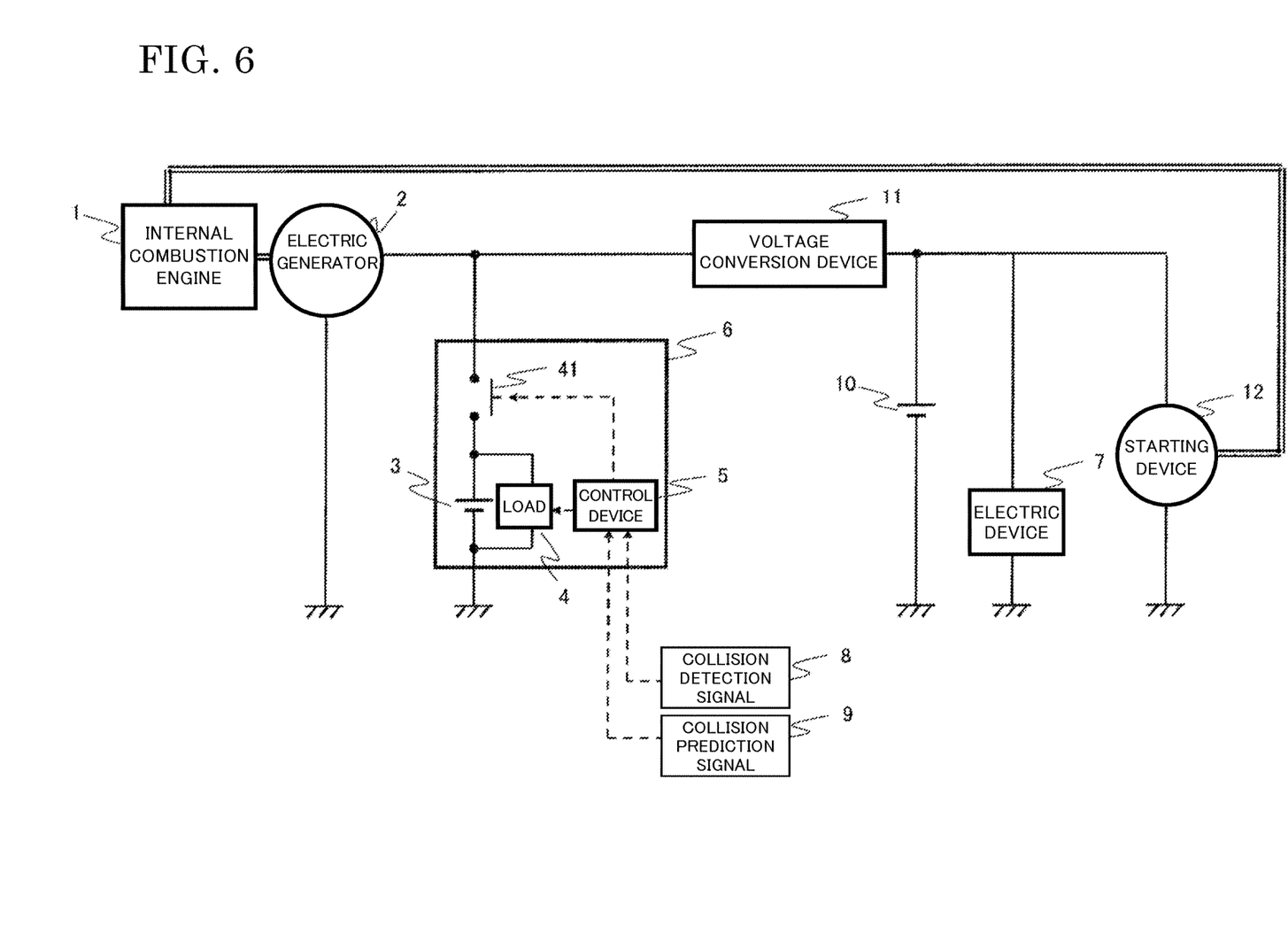
FIG. 6 is a schematic configuration diagram illustrating an example of a power supply system of an internal combustion engine including an in-vehicle power storage device according to embodiment 4 of the present invention.

FIG. 6 is a schematic configuration diagram illustrating an example of a power supply system of an internal combustion engine including an in-vehicle power storage device according to embodiment 4 of the present invention.

In embodiment 4, battery disconnecting means 41 is provided between the battery 3 and the electric device 7 to which power is supplied from the battery 3, and supply of power from the battery 3 to the electric device 7 is stopped by using the battery disconnecting means 41 in a case where collision of the vehicle is detected or predicted, and thereafter discharging of the battery 3 is performed.

In the configuration as in embodiment 4, in a case where collision of the vehicle is detected or predicted, a battery is disconnected by using the battery disconnecting means, thereby immediately preventing electric shock when an insulated portion is damaged at the collision of the vehicle.

Embodiment 5

Figure 7:
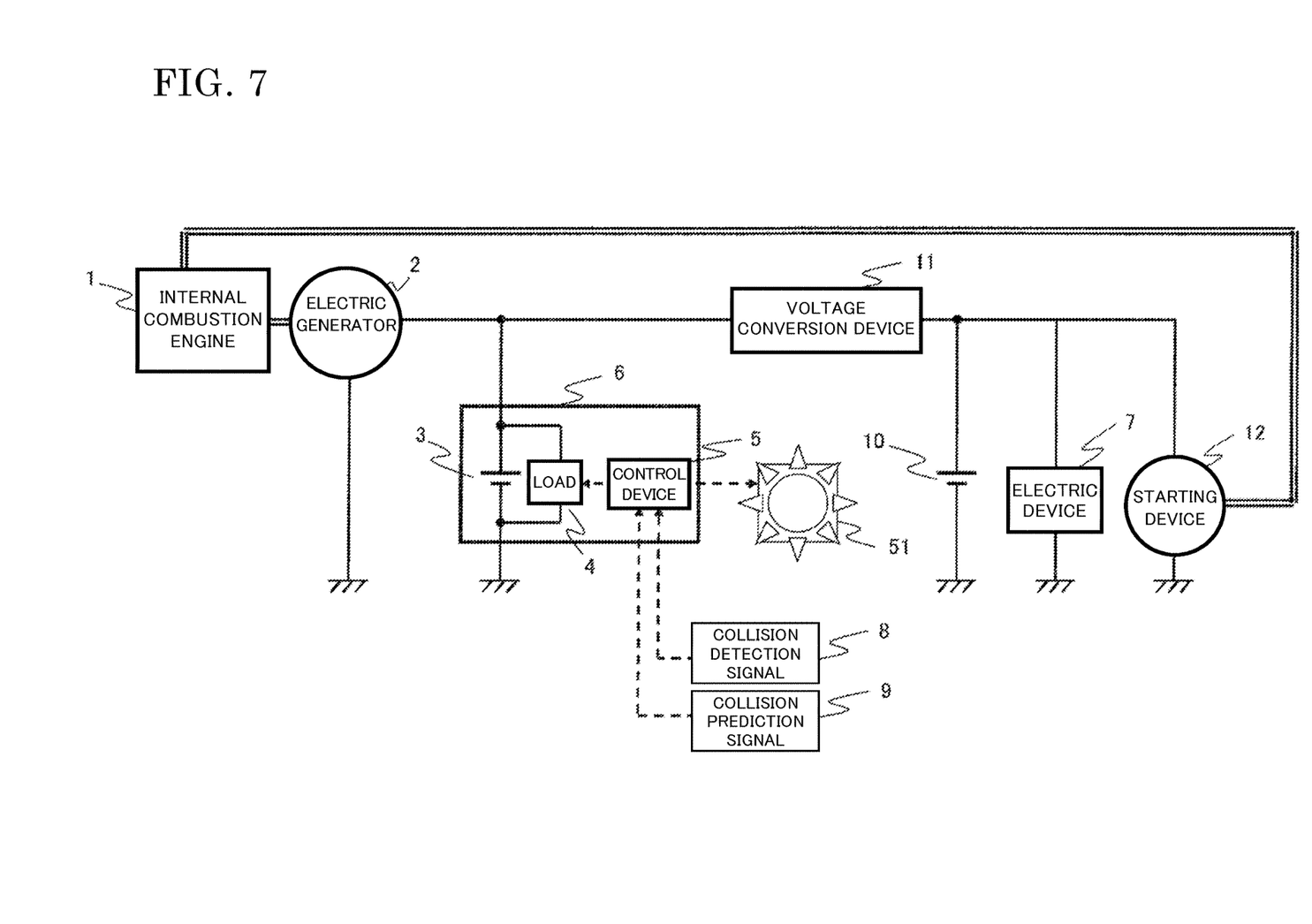
FIG. 7 is a schematic configuration diagram illustrating an example of a power supply system of an internal combustion engine including an in-vehicle power storage device according to embodiment 5 of the present invention.

FIG. 7 is a schematic configuration diagram illustrating an example of a power supply system of an internal combustion engine including an in-vehicle power storage device according to embodiment 5 of the present invention.

In embodiment 5, external notification means 51 is additionally provided. The external notification means 51 notifies a user or a helper that discharging is being performed or discharging has ended.

In FIG. 7, the number of the external notification means 51 is one. However, two external notification means may be provided for notification that discharging is being performed, and for notification that discharging has ended, respectively.

Further, colors, sounds, or the like may be outputted so as to be different between a state where discharging is being performed and a state where discharging has ended.

In the configuration as in embodiment 5, notification that the battery is being discharged is made to the outside, and therefore it can be known that the battery has not yet reached a state where electric shock can be prevented.

Further, the notification that discharging of the battery has ended is made to the outside, and therefore it can be known that the battery is in a state where electric shock can be prevented.

Embodiment 6

Figure 8:
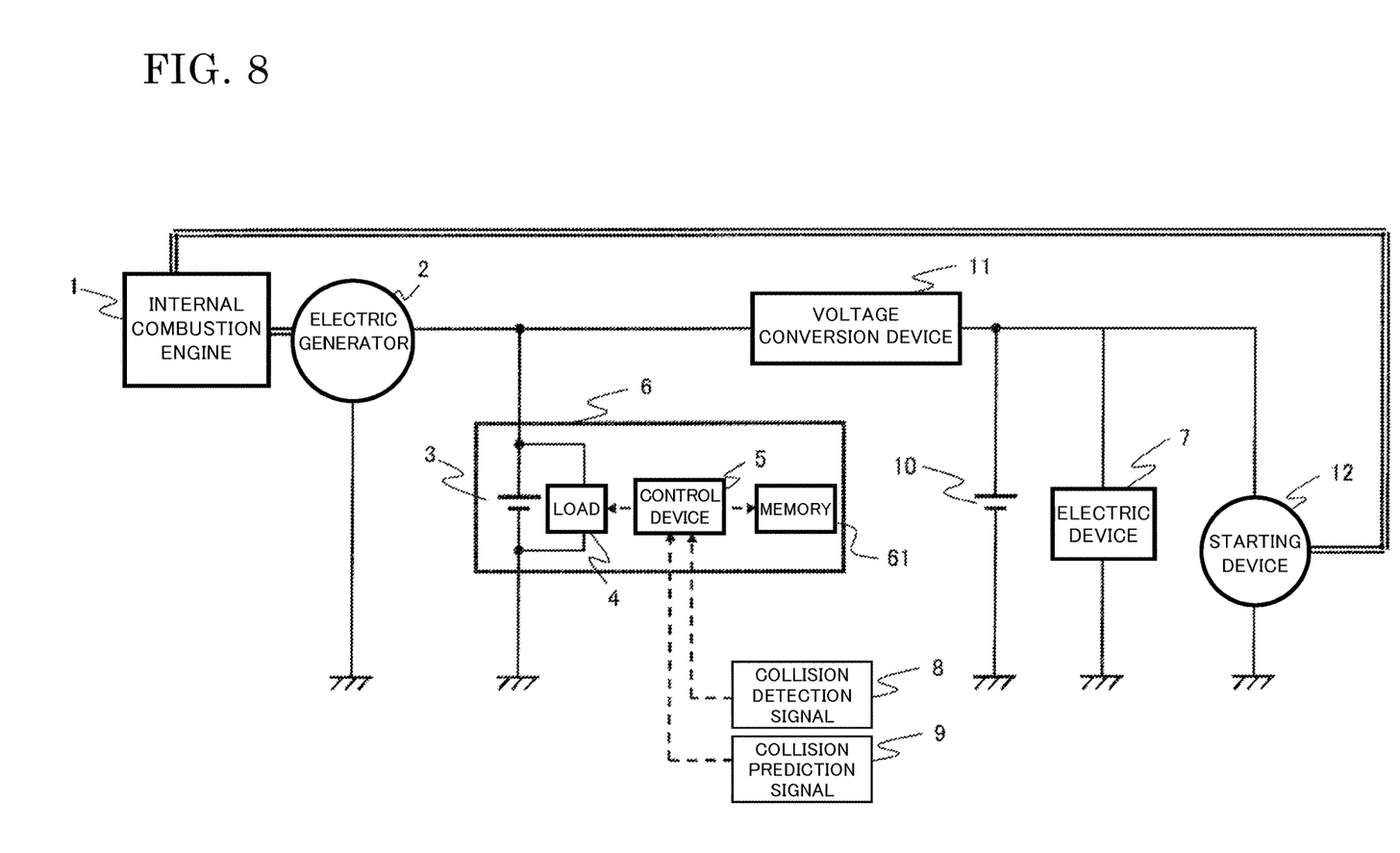
FIG. 8 is a schematic configuration diagram illustrating an example of a power supply system of an internal combustion engine including an in-vehicle power storage device according to embodiment 6 of the present invention.

FIG. 8 is a schematic configuration diagram illustrating an example of a power supply system of an internal combustion engine including an in-vehicle power storage device according to embodiment 6 of the present invention.

In embodiment 6, a memory 61 is additionally provided. In the memory 61, it is recorded that discharging due to an accident has been experienced or an abnormality of the battery has been detected.

In FIG. 8, the memory 61 is provided outside the control device 5. However, the memory 61 may be provided inside the control device 5. Further, the memory 61 may be nonvolatile or volatile.

In the configuration as in embodiment 6, whether or not a battery can be reused can be determined without directly measuring a voltage or temperature of the battery.

It is noted that, within the scope of the present invention, the above embodiments may be freely combined with each other, or each of the above embodiments may be modified or abbreviated as appropriate.

DESCRIPTION OF THE REFERENCE CHARACTERS 1 internal combustion engine, 2 electric generator, 3 battery, 4 load, 5 control device, 6 case, 7 electric device, 8 collision detection signal, 9 collision prediction signal, 10 sub-battery, 11 voltage conversion device, 12 starting device, 21 battery cell, 22 circuit opening/closing means, 23 resistor, 41 battery disconnecting means, 51 external notification means, 61 memory

The invention claimed is:

1. An in-vehicle power storage device comprising: a battery mounted in a vehicle and comprising a plurality of battery cells; battery charge-state detector which detects a charge state of the battery; and a discharging load for discharging the battery, the in-vehicle power storage device further comprising:
a control device, the control device including:
a battery discharger which performs an emergency discharging of the battery by using the load in a case where collision of the vehicle is detected or predicted and which, while discharging the battery, stops discharging the battery when the charge state of the battery detected by the battery charge-state detector becomes less than or equal to a predetermined value at which overdischarge has not been reached yet,
wherein the control device includes a battery abnormality detector which determines whether an abnormality of the battery has occurred, after the emergency discharging is started by the battery discharger and while the emergency discharging is performed but before the battery is discharged to the predetermined value higher than a near-zero value, and in a case where the battery abnormality detector determines that the battery is abnormal, the discharging is not stopped when an overall charge state of the battery detected by the battery charge-state detector becomes less than or equal to the predetermined value, and the battery is discharged until the overall charge state of the battery comprising the plurality of battery cells represents the near-zero value,
wherein the power storage device further includes a notifier providing external notification of said emergency discharging, and
wherein, when the collision of the vehicle is detected or predicted, the battery discharger starts discharging the battery without waiting for the battery abnormality detector to determine whether the abnormality of the battery has occurred, and stops discharging the battery before the battery enters an overdischarged state when the abnormality of the battery does not occur.

2. The in-vehicle power storage device according to claim 1, wherein the plurality of battery cells are connected in series with or in parallel with each other, and the load is formed by a bypass circuit including a resistor and circuit opening/closing means.

3. The in-vehicle power storage device according to claim 1, comprising battery disconnecting means provided between the battery and an electric device to which power is supplied from the battery, wherein
in a case where collision of the vehicle is detected or predicted, after supply of power from the battery to the electric device is stopped by the battery disconnecting means, the battery is discharged by the battery discharger.

4. The in-vehicle power storage device according to claim 1, wherein said notifier comprises an external notifier which makes, to the outside, notification that said emergency discharging by the battery discharger is being performed or has ended.

5. The in-vehicle power storage device according to claim 1, comprising a memory for recording that said emergency discharging has been performed by the battery discharger.

6. The in-vehicle power storage device according to claim 1, wherein the battery is a lithium ion battery, and the overdischarged state represents a state where an electrolyte solution of the lithium ion battery is decomposed, or a state where copper used for a negative electrode is ionized and dissolved in the electrolyte solution in the battery.

7. The in-vehicle power storage device according to claim 1, wherein the load is mounted in a case for accommodating the battery.

8. The in-vehicle power storage device according to claim 1, wherein the battery discharger performs the emergency discharging in response to the control device receiving a collision detection signal from an air bag control.

9. The in-vehicle power storage device according to claim 1, wherein the battery discharger performs the emergency discharging in response to the control device receiving a collision prediction signal from a front detection radar or a camera control device.

10. A method for controlling an in-vehicle power storage device that includes: a battery mounted in a vehicle and comprising a plurality of battery cells; battery charge-state detector for detecting a charge state of the battery; and a discharging load for discharging the battery, the method comprising:
- a first operation of emergency discharging the battery by using the load in a case where collision of the vehicle is detected or predicted;
- a second operation of determining whether an abnormality of the battery has occurred, while the emergency discharging is performed but before the battery is discharged to a predetermined value higher than a near-zero value;
- a third operation of stopping the emergency discharging of the battery which is being performed in the first operation when the overall charge state of the battery comprising the plurality of battery cells becomes less than or equal to the predetermined value;
- a fourth operation of, in a case where the abnormality of the battery is detected during said second operation of emergency discharging, discharging the battery until the overall charge state of the battery comprising the plurality of battery cells represents the near-zero value, without stopping discharging the battery when the overall charge state of the battery becomes less than or equal to the predetermined value; and
- a fifth operation of providing external notification of said emergency discharging,
- wherein, when the collision of the vehicle is detected or predicted, the first operation of emergency discharging the battery is started before the second operation of determining whether the abnormality of the battery has occurred, is completed, and performing the third operation of stopping the emergency discharging of the battery before the battery enters an overdischarged state, when the abnormality of the battery does not occur.

11. The method according to claim 10, wherein said external notification indicates that said emergency discharge is underway.

12. The method according to claim 10, wherein said external notification indicates that said emergency discharge has been completed.

13. The method according to claim 10, further comprising the step of recording in a memory that said emergency discharging has been performed.

14. An in-vehicle power storage device comprising: a battery mounted in a vehicle and comprising a plurality of battery cells; battery charge-state detector which detects a charge state of the battery; and a discharging load for discharging the battery, the in-vehicle power storage device further comprising a control device, the control device including:
- a battery discharger which, upon detection of a first problem, begins an emergency discharge operation by which said load is used to discharge said battery until the overall charge state of the battery comprising the plurality of battery cells becomes a first charge state, said battery discharger continuing discharge of said battery past said first charge state in response to a second problem detected after commencement of said discharge operation, said discharge operation terminating at said first charge state when said second problem is not detected during said discharge operation; and
- a notifier providing external notification of said emergency discharge,
- wherein the battery discharger determines whether an abnormality of the battery has occurred, while the emergency discharge operation is performed but before the battery is discharged to a predetermined value higher than a near-zero value, and
- wherein, when the collision of the vehicle is detected or predicted, the battery discharger starts discharging the battery before a determination of whether the abnormality of the battery has occurred, is completed, and stops discharging the battery before the battery enters an overdischarge state, when the abnormality of the battery does not occur.

15. The in-vehicle power storage device according to claim 14, wherein said external notification indicates that said emergency discharge is underway.

16. The in-vehicle power storage device according to claim 14, wherein said external notification indicates that said emergency discharge has been completed.

17. The in-vehicle power storage device according to claim 14, further comprising a memory for recording that said emergency discharging has been performed.

* * * * *